US008119728B2

(12) United States Patent
Obrecht

(10) Patent No.: US 8,119,728 B2
(45) Date of Patent: Feb. 21, 2012

(54) STORAGE-STABLE, HYDROXY-MODIFIED MICROGEL LATICES

(75) Inventor: Werner Obrecht, Moers (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 12/614,587

(22) Filed: Nov. 9, 2009

(65) Prior Publication Data
US 2010/0120973 A1 May 13, 2010

(30) Foreign Application Priority Data
Nov. 13, 2008 (DE) .......................... 10 2008 056 975

(51) Int. Cl.
*C08L 33/00* (2006.01)
*C08L 33/02* (2006.01)
*C08L 31/00* (2006.01)
*C08F 290/06* (2006.01)

(52) U.S. Cl. ........ 524/558; 524/522; 524/591; 524/533; 525/223; 525/228; 525/301; 525/303; 525/221

(58) Field of Classification Search .................. 524/317, 524/558, 522, 523, 591, 533; 525/223, 228, 525/301, 303
See application file for complete search history.

(56) References Cited

U.S. PATENT DOCUMENTS

| | | |
|---|---|---|
| 3,915,909 A | 10/1975 | Schnoring et al. |
| 4,345,067 A | 8/1982 | Wunder |
| 4,536,568 A | 8/1985 | Wunder |
| 4,920,176 A | 4/1990 | Jorgensen, Jr. |
| 5,124,408 A | 6/1992 | Engels et al. |
| 5,395,891 A | 3/1995 | Obrecht et al. |
| 5,703,189 A | 12/1997 | Tsuji et al. |
| 5,807,941 A | 9/1998 | Tsuji et al. |
| 6,399,706 B1 | 6/2002 | Obrecht et al. |
| 6,559,219 B2 | 5/2003 | Tadaki et al. |
| 6,605,671 B2 | 8/2003 | Obrecht |
| 6,632,888 B2 | 10/2003 | Obrecht et al. |
| 6,642,315 B2 | 11/2003 | Amino et al. |
| 6,649,724 B2 | 11/2003 | Nakamura et al. |
| 6,653,404 B2 | 11/2003 | Konno et al. |
| 6,699,935 B2 | 3/2004 | Akema et al. |
| 6,737,478 B2 | 5/2004 | Obrecht et al. |
| 6,747,095 B2 | 6/2004 | Konno et al. |
| 6,797,780 B2 | 9/2004 | Obrecht et al. |
| 6,897,279 B2 | 5/2005 | Nakamura et al. |
| 6,977,286 B2 | 12/2005 | Konno et al. |
| 7,094,855 B2 | 8/2006 | Nakamura et al. |
| 2001/0006995 A1 | 7/2001 | Obrecht et al. |
| 2003/0236348 A1* | 12/2003 | Wendling et al. ............. 524/801 |
| 2005/0182158 A1 | 8/2005 | Ziser et al. |
| 2007/0135579 A1 | 6/2007 | Obrecht et al. |
| 2007/0232733 A1 | 10/2007 | Ziser et al. |

FOREIGN PATENT DOCUMENTS

| | | |
|---|---|---|
| DE | 2751786 A1 | 11/1977 |
| DE | 19701487 A1 | 1/1997 |
| DE | 19701488 A1 | 1/1997 |
| DE | 19919459 A1 | 11/2000 |
| DE | 10 2007 011 427 A1 | 9/2008 |
| EP | 1520732 A1 | 6/2005 |
| WO | 2008107192 A1 | 9/2008 |

OTHER PUBLICATIONS

European Search Report from co-pending Application EP09175099.2 dated Jan. 29, 2010, 6 pages.
Methoden der organischen Chemie [Methods of organic chemistry], Houben-Weyl, vol. XIV/1, Makromolekulare Stoffe [Macromolecular substances], Part 1, pp. 192-194, Georg Thieme Verlag, 1961.
Ullmann's Encyclopedia of Industrial Chemistry, 6th Edition, vol. 31, pp. 345-355.
W. Bardendrecht, L.T. Lees in Ullmanns Encyclopädie der Technischen Chemie [Ullmann's Encyclopaedia of Industrial Chemistry], 4th Edition, vol. 12, 525-538, Verlag Chemie, Weinheim—New York 1976.
Maron, S. H.; Madow, B. P.; Borneman, E.: "The effective equivalent weights of some rosin acids and soaps", Rubber Age, Apr. 1952, 71-72.
Ullmann's Encyclopedia of Industrial Chemistry, 6th Edition, vol. 13, pp. 75-108.
Maron, S. H., Ulevitch, I. N., Elder, M. E. "Fatty and Rosin Acids, Soaps, and Their Mixtures", Analytical Chemistry, vol. 21, 6, 691-695.
J. Brandrup, E. H. Immergut, Polymer Handbook, pp. III-139-III-192; W.A.Lee and R.A. Rutherford "The Glass Transition Temperature of Polymers", Wiley & Sons 1975.

* cited by examiner

*Primary Examiner* — James J Seidleck
*Assistant Examiner* — Deve E Valdez
(74) *Attorney, Agent, or Firm* — Nicanor A. Kohncke

(57) ABSTRACT

A composition is described, encompassing a constituent selected from the group consisting of a modified resin acid (I), a fatty acid (II) and a mixture composed of a modified resin acid (I) and of a fatty acid (II), where the degree of neutralization of the constituent is from 104 to 165%. Its use for the production of microgels is also described.

9 Claims, No Drawings

STORAGE-STABLE, HYDROXY-MODIFIED MICROGEL LATICES

The present invention relates to microgels and to emulsifier compositions which are used in the production of the said microgels. The present invention further relates to a process for the production of the microgels and of the emulsifier compositions. The present invention also relates to the use of the emulsifier composition for the production of microgels.

Microgels and rubber particles are examples of the various terms used for microgels. Microgels are described inter alia in EP 0 405 216 A, DE 42 20 563 A, DE 197 01 488 A and DE 197 01 487 A. Microgels are used, for example, to improve the processability of rubber mixtures, and also to improve the properties of vulcanisates, in particular to improve physical properties such as modulus, ultimate tensile strength, abrasion resistance, rolling resistance, heat-build-up under dynamic load and wet slip resistance. These property improvements make microgels particularly suitable for use in the production of various tyre components, in particular of tyre treads.

Functionalised microgels are also known. Functional microgels are described by way of example in EP 1 152 030 A, EP 1 664 158 A, EP 1 149 866 A, EP 1 149 867 A, EP 1 298 166 A, EP 1 291 369 A, EP 1 245 630 A and EP 1 520 732 A, and hydroxy-modified microgels are of particular interest here. Hydroxy-modified microgels are used by way of example in polyurethanes (cf. DE 199 19 459 A). In the production of tyre treads, hydroxy-modified microgels are frequently used in combination with silica-containing fillers, giving tyres with improved driving performance.

In order to achieve good vulcanisate properties, the functionalised, for example hydroxy-modified, gels are "activated" or "coupled" to the rubber matrix during vulcanisation. Suitable activators are sulphur-containing organosilicon compounds (EP 1 063 259 A), multifunctional isocyanates (EP 1 110 986 A), isocyanatosilanes (WO 02/12389 A), and also phenolic resin educts (WO 02/32990 A). It is also known that high content of superficial hydroxy groups is necessary in order to achieve good physical properties of the gel-containing vulcanisates (EP 1 520 732 A). There is consequently a demand for microgels which have a high hydroxy group content.

Two particular processes are used for the production of these hydroxy-modified microgels:

In a first process, for introduction of functional groups via grafting, monomers having functional groups are grafted onto an unmodified microgel in the latex phase. The hydroxy modifiers used are, for example, the acrylates or methacrylates of hydroxy ethanol, hydroxy propanol and hydroxy butanol. The unmodified microgel used as graft base is obtained, for example, via crosslinking of a substantially uncrosslinked rubber latex by means of dicumyl peroxide (DE 100 35 493 A). This procedure for the production of hydroxy-modified microgels is very complicated, because it requires a large number of steps in the process.

In a second process, the lattices of the hydroxy-modified microgels are obtained via copolymerisation (of more than two monomers) in a reaction step via emulsion processes. Corresponding procedures are described in EP 1 664 158 A, EP 1 149 866 A, EP 1 149 867 A, EP 1 298 166 A, EP 1 291 369 A and EP 1 245 630 A. The emulsifier systems used in the patent specifications mentioned are based on sulphonic acids, modified resin acids, fatty acids and mixtures of the same.

Use of emulsifier mixtures based on sulphonic acid (EP 1 664 158 A) or of emulsifier mixtures based mainly on sulphonates and on very small amounts of carboxylates give lattices of the hydroxylated microgels with sufficiently high latex stability. However, coagulation of these rubber lattices produces very fine crumb of diameter less than 2 mm, and it is not possible to use sieves on an industrial scale to separate this quantitatively from latex serum. The result is considerable yield losses.

Use of emulsifiers based on modified resin acids (EP 1 149 866 A, EP 1 149 867 A and EP 1 298 166 A) or of mixtures of modified resin acid with fatty acid with no precise definition of proportions (EP 1 291 369 A and EP 1 245 630 A) produces lattices which give adequately large crumb on coagulation, and can therefore be separated from latex serum without yield losses, for example by using sieves.

However, the hydroxylated lattices produced in this way have inadequate stability. For the purposes of the invention, inadequate stability in particular means that there is a possibility of latex coagulation during the emulsion polymerisation process, latex coagulation during the removal of volatile constituents by steam distillation, latex coagulation during transport of the lattices by pumping, and particle-size change and/or latex coagulation during latex storage.

This inadequate latex stability leads in particular to the following disadvantages:
1) During the polymerisation process, polymer deposits form on the reactor wall. This reduces reactor operating times and increases cleaning cost.
2) During removal of unreacted monomers by steam distillation, partial or complete coagulation of the lattices occurs. This significantly reduces yields, and considerable cost is incurred for cleaning the assemblies in which the steam distillation process is carried out.
3) Partial or quantitative latex coagulation takes place during procedures involving pumped circulation, because of reduced shear resistance. This likewise significantly reduces yields.
4) When the hydroxylated microgels are produced according to the teaching of the prior art, the result is an increase in the apparent diameter of the latex particles and latex coagulation during latex storage, without any application of shear forces.

The latex-stability problems mentioned particularly occur with microgels having hydroxy contents above 5% by weight.

In view of the prior art described, a first object of the present invention is to provide microgels which contain hydroxy groups and which have adequate stability in the latex state, and which provide crumb of adequate size during latex coagulation.

The microgels should moreover preferably have high gel content, in particular of more than 70% by weight.

A further intention is that the present invention also in particular achieve the object of providing microgels with maximum hydroxy content, determined as hydroxy number (OH number).

A final intention is that the present invention in particular also achieve the object of providing microgels with a swelling index smaller than 30.

Another object of the present invention, in respect of the production of the desired microgels, is to provide a procedure for the production of microgels with improved shear resistance and improved storage stability. The intention is that the resultant microgels preferably be produced in a cost-effective manner using short polymerisation times, particularly preferably using polymerisation times below 10 hours, and preferably with high polymerisation conversions, particularly preferably with polymerisation conversions of more than 80%.

The microgels obtained via the process of the invention are moreover intended to provide, during latex coagulation, adequately large crumb, preferably measuring more than 5 mm, easily capable of separation from latex serum by way of sieves.

The said object is achieved via the use of a specific emulsifier composition, used for the production of the microgels.

The present invention therefore firstly provides an emulsifier composition.

The emulsifier composition of the invention is characterized in that it encompasses at least one constituent selected from the group consisting of a modified resin acid (I), a fatty acid (II) and a mixture composed of a modified resin acid (I) and of a fatty acid (II), where the degree of neutralisation of the constituent is from 104 to 165%.

The degree of neutralisation here is based either on one of the individual compounds of the modified resin acid (I) and, respectively, fatty acid (II) or else on the entire mixture composed of modified resin acid (I) and fatty acid (II).

According to the invention, it has been found that use of the said specific emulsifier composition in the production of microgels via emulsion polymerisation gives microgels which have improved shear resistance and improved storage stability.

At the same time, the quality of the resultant microgels with regard to other physical properties is at least equal to the quality of the conventional microgels known from the prior art.

The resultant microgels here can generally have more than 70% by weight gel content, preferably more than 75% by weight, particularly preferably more than 80% by weight.

The microgels obtained using the emulsifier composition of the invention moreover generally have a swelling index of less than 30, preferably less than 25, particularly preferably less than 20.

The microgels moreover have more than 0.1% by weight content of copolymerised monomers containing hydroxy groups. The hydroxy number of the resultant microgels is generally greater than 0.5.

The microgels can moreover preferably be obtained in a cost-effective manner using short polymerisation times, particularly preferably using polymerisation times below 10 hours, and preferably with high polymerisation conversions, particularly preferably with polymerisation conversions higher than 80%.

Finally, the microgels give sufficiently large crumb during latex coagulation, preferably measuring more than 5 mm, so that this can be separated from the latex serum efficiently by way of sieves.

Emulsifier System

The present invention provides an emulsifier system in which at least one modified resin acid (I) and at least one fatty acid (II) is used.

However, for the purposes of the present invention, it is also possible to use a plurality of different modified resin acids (I) in the emulsifier composition of the invention, for example 2, 3, 4 or 5 different resin acids.

However, for the purposes of the present invention, it is also possible to use a plurality of different modified fatty acids (I) in the emulsifier composition of the invention, for example 2, 3, 4 or 5 different fatty acids.

The use of the alkali metal salts of fatty acids in the production of polymers has been known for a long time (Methoden der organischen Chemie [Methods of organic chemistry], Houben-Weyl, Volume XIV/1, Makromolekulare Stoffe [Macromolecular substances], Part 1, pages 192-194, Georg Thieme Verlag, 1961). The chain length of the fatty acids is from 6 to 22 carbon atoms. Mono- or polyunsaturated fatty acids are also suitable. The acids can, as mentioned, be used alone or in the form of a mixture of acids of different chain length. If a mixture is used, the proportion of fatty acids having chain lengths of from 16 to 18 carbon atoms should be ≧80%.

For the purposes of the present invention, it is also possible to make simultaneous use of a plurality of different modified resin acids (I) with a plurality of different fatty acids (II).

For the purposes of the present invention, a modified resin acid (I) is a resin acid which has been obtained via dimerisation, disproportionation and/or hydrogenation of unmodified resin acids. Appropriate modified resin acids are obtained by starting from unmodified resin acids which in turn by way of example are selected from the group consisting of pimaric acid, neoabietic acid, abietic acid, levopimaric acid and palustric acid, by using the modification methods mentioned.

In one particularly preferred embodiment of the present invention, the modified resin acid is a disproportionated resin acid (Ullmann's Encyclopedia of Industrial Chemistry, 6th Edition, Volume 31, pp. 345-355). The preferred disproportionated resin acid is commercially available as modified resin acid.

The resin acids used are tricyclic diterpene carboxylic acids obtained from roots, pine balsam and tall oil. These "unmodified" resin acids can by way of example be converted as described in W. Bardendrecht, L. T. Lees in Ullmanns Encyclopadie der Technischen Chemie [Ullmann's Encyclopaedia of Industrial Chemistry], 4th Edition, Vol. 12, 525-538, Verlag Chemie, Weinheim—New York 1976 to give disproportionated resin acids. In the form of their alkaline metal salts, disproportionated resin acids are mainly used as emulsifiers for the production of polymers and lattices (W. Barendrecht, L. T. Lees in Ullmanns Encyclopadie der Technischen Chemie [Ullmann's Encyclopaedia of Industrial Chemistry], 4th Edition, Vol. 12, 530, Verlag Chemie, Weinheim—New York 1976).

The composition of the invention also encompasses at least one fatty acid (II) alongside the modified resin acid (I).

The fatty acids preferably contain from 6 to 22 carbon atoms per molecule, particularly preferably from 6 to 18 carbon atoms per molecule. They can be completely saturated acids or can contain one or more double bonds or triple bonds within the molecule.

Examples of fatty acids suitable according to the invention are caproic acid, lauric acid, myristic acid, palmitic acid, stearic acid, oleic acid, linoleic acid and linolenic acid.

In another embodiment of the present invention, the carboxylic acids can also be present in mixtures from specific sources, examples being castor oil, cottonseed, peanut oil, linseed oil, coconut fat, palm kernel oil, olive oil, rapeseed oil, soybean oil, fish oil and bovine tallow (Ullmann's Encyclopedia of Industrial Chemistry, 6th Edition, Volume 13, pp. 75-108).

Preferred carboxylic acids derive from bovine tallow and are partially hydrogenated acids. Particular preference is therefore given to partially hydrogenated tallow fatty acid.

The resin acids and the fatty acids are commercially available in the form of free carboxylic acids, or in partially or fully neutralised form.

In order to determine the alkali metal addition necessary for the polymerisation process, the resin acids and fatty acids to be used are characterized via acidimetric titration (Maron, S. H., Ulevitch, I. N., Elder, M. E. "Fatty and Rosin Acids, Soaps, and Their Mixtures", Analytical Chemistry, Vol. 21, 6, 691-695; Maron, S. H.; Madow, B. P.; Borneman, E. "The effective equivalent weights of some rosin acids and soaps", Rubber Age (1952), 71-72). In this way the amounts of free carboxylic acids and of emulsifier salts are determined, in order to calculate the amounts to be added for the targeted adjustment of the degrees of neutralisation of the resin/fatty acid mixtures used in the polymerisation.

The emulsifiers being mixtures with unknown average molar weight, the precise adjustment of the degree of neutralisation in the first step necessitates a titrimetric characterisation of the emulsifiers employed, which is carried out preferably by the above procedure.

The degree of neutralisation of the emulsifiers (R—COOH) containing carboxy groups is calculated on the basis of the following stoichiometric formula; if the degree of neutralisation here is 100%, all of the carboxy groups of the emulsifier have been neutralised with an equimolar amount of a metal hydroxide compound (MeOH).

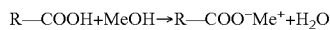

Me=metal hydroxide

The degree of neutralisation of the resin/fatty acid mixture is important for achievement of good latex stabilities. The degree of neutralisation of the resin acids (I) and of the fatty acids (II) is preferably from 104 to 165%, preferably from 106 to 160%, with particular preference from 110 to 155%; a degree of neutralisation of 100% here means complete salt formation, and a degree of neutralisation of more than 100% here means a corresponding excess of base.

Examples of bases that can be used for the neutralisation of the resin acids and fatty acids are LiOH, NaOH, KOH, $NH_3$ and/or $NH_4OH$. Preference is given here to bases which do not form sparingly soluble salts with the acids. Particularly preferred bases are LiOH, NaOH, KOH and $NH_4OH$.

The neutralisation of the carboxylic acids here can take place prior to the actual use of the emulsifier composition, but is preferably in-situ neutralisation when the materials are charged to the reactor, or in a separate container prior to addition to the polymerisation reactor.

The resin acids and fatty acids are used as emulsifier in the production of microgels, in the form of single component or jointly; the amount of resin acid or fatty acid here, or the total amount of resin acid and fatty acid, is from 2.2 to 12.5 parts by weight, preferably from 2.5 to 10 parts by weight, particularly preferably from 2.8 to 7.5 parts by weight, based in each case on 100 parts by weight of the monomer mixture.

The ratio by weight between the salts of resin acid (I) and fatty acid (II) is preferably from 0.05:1 to 15:1, particularly preferably from 0.08:1 to 12:1.

The emulsifier composition of the invention can comprise further constituents alongside the essential constituents of at least one salt of a resin acid (I) and of at least one salt of a fatty acid (II).

The emulsifier composition of the invention can therefore, for example, additionally encompass neutral and anionic emulsifiers.

The use of further emulsifiers is possible, but not compulsory, in particular during the polymerisation process, and also in the form of subsequent addition after the polymerisation process for the production of the microgels. Anionic and non-ionic emulsifiers can be used. Examples of anionic emulsifiers are alkyl sulphates, such as n-dodecyl sulphate (e.g. Texapon® K12 from Cognis); alkylsulphonates (e.g. Mersolat® K30 from Lanxess Deutschland GmbH); arylsulphonates (e.g. Marlon® from Sasol Germany GmbH); methylene-bridged bisnaphthalenesulphonates (e.g. Baykanol® PQ from Lanxess Deutschland GmbH); and mono- and diesters of sulphosuccinic acid (sodium salt of dioctyl sulphosuccinic acid). Suitable non-ionic emulsifiers are polyethylene oxide and polypropylene oxide, and also copolymers of these two monomers. Adducts of ethylene oxide and propylene oxide onto aliphatic and aromatic phenols, and also onto amines, are also suitable. It is also possible to use polymeric neutral or anionic stabilisers. Examples here are polyvinyl alcohol, hydroxyalkylcelluloses, polyvinylpyrrolidone and sodium polyacrylate.

Use of the neutral and anionic emulsifiers firstly improves latex stability; secondly, the rubber crumb produced on coagulation of the lattices is smaller. For this reason, it is preferable to exert control over the selection and amount of the neutral and anionic emulsifiers added. The amount added of anionic emulsifiers, if these are used, is usually in the range from 0 to 0.5 part by weight, preferably from 0 to 0.25 part by weight, particularly preferably from 0 to 0.10 part by weight.

The above emulsifier composition is preferably used in the production of microgels.

The present invention therefore also provides the use of the above composition as emulsifier system, in particular for the production of storage-stable dispersions of microgels containing hydroxy groups, and for the purposes of the present invention storage-stable dispersions here are microgels which contain hydroxy groups and which do not exceed a certain increase in particle diameter as a function of storage time.

The present invention further provides a process for the production of a microgel in which the composition defined above is used as emulsifier.

The microgels thus obtained can have from 10 to 100% by weight gel content, and it is possible here, by using the emulsifier composition of the invention, to produce microgels with gel content which is generally more than 70% by weight, preferably more than 75% by weight, particularly preferably more than 80% by weight.

The microgels obtained using the emulsifier composition of the invention moreover have a swelling index which is generally less than 30, preferably less than 25, particularly preferably less than 20.

The microgels moreover have more than 0.1% by weight content of copolymerized monomers containing hydroxy groups. The hydroxy number of the resultant microgels is generally more than 0.5.

The microgels here are preferably produced by emulsion polymerisation.

For the purposes of the present invention, the amount of the emulsifier composition of the invention used in the process of the invention is preferably at least 2.2 parts by weight, particularly preferably at least 2.5 parts by weight, based in each case on the monomer composition defined in more detail at a later stage below.

For the purposes of the present invention, the amount of the emulsifier composition of the invention used in the process of the invention is preferably from 2.2 to 12.5 parts by weight, preferably from 2.5 to 10 parts by weight, particularly preferably from 2.8 to 7.5 parts by weight, based in each case on 100 parts by weight of the monomer mixture.

Particularly preferred ranges are amounts of from 2.2 to 10.00% by weight, more preferably from 2.5 to 8.00% by weight.

The polymerisation reaction is preferably carried out at a temperature of from 10 to 100° C., particularly preferably from 12 to 90° C., in particular from 15 to 50° C.

The emulsion polymerisation reaction here can be carried out by an isothermal, semiadiabatic or completely adiabatic procedure.

The process of the invention can moreover encompass a coagulation process step carried out at temperatures above the glass transition temperature of the microgel. The coagulation temperatures here are preferably higher than the glass transition temperature of the microgel by at least 10° C., particularly at least 15° C., in particular at least 20° C. Compliance with the said coagulation temperatures provided according to the invention has a codeterminant effect on the crumb size of the resultant microgels.

There follows a more detailed explanation of the constituents used alongside the emulsifier composition in the process of the invention.

Monomers

Production of the microgels uses monomer mixtures composed of conjugated dienes (A), of vinylaromatic monomers (B), of crosslinking monomers (C) and of monomers (D) containing hydroxy groups, where the total amount of the monomers is 100 parts by weight.

It is moreover possible, in another embodiment of the present invention, to produce a hydroxylated crosslinked microgel from only three components, namely constituents (A), (C) and (D), or (B), (C) and (D).

Preferred conjugated dienes (A) used are 1,3-butadiene, isoprene, 2,3-dimethyl-1,3-butadiene and chloroprene. Preference is given to 1,3-butadiene and isoprene.

It is preferable to use from 0 to 94.9% by weight of the diene (A), with preference from 0 to 94.0% by weight, with particular preference from 0 to 93.5% by weight, based in each case on 100 parts by weight of the monomers used in the polymerisation reaction.

Examples of vinylaromatic monomers (B) used are styrene, α-methylstyrene, 2-methylstyrene, 3-methylstyrene, 4-methylstyrene, 2,4-dimethylstyrene, 2,4-diisopropylstyrene, 4-tert-butylstyrene or tert-butoxystyrene. Preference is given to styrene and α-methylstyrene. The amount used of the vinylaromatic monomers (B) is generally from 0 to 94.9% by weight, preferably from 0 to 94.0% by weight, particularly preferably from 0 to 93.5% by weight, based in each case on 100 parts by weight of the monomers used in the polymerisation reaction.

Crosslinking monomers (C) used are monomers which contain at least 2 double bonds in the molecule. Among these are the (meth)acrylates of diols having from 1 to 20 carbon atoms, e.g. ethanediol di(meth)acrylate, 1,2-propanediol di(meth)acrylate, 1,3-propanediol (meth)acrylate, 1,2-butanediol di(meth)acrylate, 1,3-butanediol di(meth)acrylate, 1,4-butanediol di(meth)acrylate, 1,6-hexanediol di(meth)acrylate (C1), polyethylene glycol di(meth)acrylates and polypropylene glycol di(meth)acrylates, and also diols based on copolymers of ethylene oxide and propylene oxide having degrees of polymerisation of from 1 to 25 (C2), diols based on polymerized tetrahydrofuran having degrees of polymerisation of from 1 to 25 (C3), the bis- and tris(meth)acrylates of trihydric alcohols, e.g. trimethylolpropane di(meth)acrylate, trimethylolpropane tri(meth)acrylate, glycerol di(meth)acrylate and glycerol tri(meth)acrylate (C4), the bis-, tris- and tetra(meth)acrylates of tetrahydric alcohols, e.g. pentaerythritol di(meth)acrylate, pentaerythritol tri(meth)acrylate and pentaerythritol tetra(meth)acrylate (C5), aromatic polyvinyl compounds (C6), e.g. divinylbenzene, diisopropenylbenzene, trivinylbenzene, and also other compounds having at least two vinyl groups, e.g. triallyl cyanurate, triallyl isocyanurate, vinyl crotonate and allyl crotonate (C7). Preference is given to the ethanediol, 1,3-propanediol, 1,4-butanediol, 1,6-hexanediol, trimethylolpropane, and pentaerythritol esters of (meth)acrylic acid, and also to the aromatic polyvinyl compound divinylbenzene.

The amount used of the crosslinking monomers (C) is from 0.1% by weight to 15% by weight, preferably from 0.5 to 12.5% by weight, particularly preferably from 1 to 7.5% by weight, based in each case on 100 parts by weight of the monomers used in the polymerisation reaction.

A parameter especially affecting the gel content and the swelling index of the microgels, alongside a number of other parameters, such as the amount of regulator, the conversion in the polymerisation reaction and the polymerisation temperature, is the amount of crosslinking monomer (C). The monomer (C) also increases the glass transition temperature of corresponding non-crosslinked homo- and/or copolymers composed of the monomers (A) and (B).

Monomers (D) used which contain hydroxy groups are generally hydroxyalkyl(meth)acrylates (D1), hydroxyalkyl crotonates (D2), mono(meth)acrylates of polyols (D3), hydroxy-modified unsaturated amides (D4), aromatic vinyl compounds (D5) containing hydroxy groups, and also other monomers (D6) containing hydroxy groups.

Examples of hydroxyalkyl(meth)acrylates (D1) are 2-hydroxyethyl(meth)acrylate, 3-hydroxyethyl(meth)acrylate, 2-hydroxypropyl(meth)acrylate, 3-hydroxypropyl(meth) acrylate, 2-hydroxybutyl(meth)acrylate, 3-hydroxybutyl (meth)acrylate and 4-hydroxybutyl(meth)acrylate.

Examples of hydroxyalkyl crotonates (D2) are 2-hydroxyethyl crotonate, 3-hydroxyethyl crotonate, 2-hydroxypropyl crotonate, 3-hydroxypropyl crotonate, 2-hydroxybutyl crotonate, 3-hydroxybutyl crotonate and 4-hydroxybutyl crotonate.

Mono(meth)acrylates of polyols (D3) derive from di- and polyhydric alcohols, e.g. ethylene glycol, propanediol, butanediol, hexanediol, trimethylolpropane, glycerol, pentaerythritol, or else from oligomerised ethylene glycol and propylene glycol, where these contain from 1 to 25 of the glycol units mentioned.

Examples of hydroxy-modified unsaturated amides (D4) are monomers such as N-hydroxymethyl(meth)acrylamide, N-(2-hydroxyethyl)(meth)acrylamide and N,N-bis(2-hydroxyethyl)(meth)acrylamide.

Aromatic vinyl compounds (D5) containing hydroxy groups are 2-hydroxystyrene, 3-hydroxystyrene, 4-hydroxystyrene, 2-hydroxy-α-methylstyrene, 3-hydroxy-α-methylstyrene, 4-hydroxy-α-methylstyrene and 4-vinylbenzyl alcohol.

An example of other monomers (D6) containing hydroxy groups is (meth)allyl alcohol.

The preferred amount used of the monomers (D) containing hydroxy groups is from 0.1 to 20% by weight, with preference from 0.5 to 15% by weight, particularly from 1 to 12.5% by weight, based in each case on 100 parts by weight of the monomers used in the polymerisation reaction.

The glass transition temperature of the microgel is established via the ratio of the copolymerized monomers (A), (B), (C) and (D). The glass transition temperature can be approximated by using the Fox-Flory relationship, where the proportion by weight of the monomers (A) and (B) is a decisive factor in arriving at a first approximation of the glass transition temperature of the microgel.

$$Tg = \frac{m_A}{Tg_A} + \frac{m_B}{Tg_B}$$

$Tg$: glass transition temperature of copolymer $Tg_A$: glass transition temperature of homopolymer $A$ $Tg_B$: glass transition temperature of homopolymer $B$ $m_A$: proportion by weight of monomer $A$ $m_B$: proportion by weight of monomer $B$ The Fox-Flory relationship advantageously uses the following glass transition temperatures for the homopolymers of the monomers (A) and (B), e.g. polybutadiene, polyisoprene, polystyrene, poly-4-methylstyrene and poly(α)methylstyrene:

| | |
|---|---|
| polybutadiene: | −80° C. |
| polyisoprene: | −65° C. |
| polystyrene: | 100° C. |
| poly-4-methylstyrene: | 104° C. |
| poly(α)methylstyrene: | 115° C. |

Glass temperatures of other homopolymers of (A) and (B) are found in J. Brandrup, E. H. Immergut, Polymer Handbook, Wiley & Sons 1975.

The result of copolymerisation with the crosslinking monomers (C) is generally that the glass transition temperatures are higher by from 1° C. to 10° C. than those of the corresponding non-crosslinked homo- or copolymers, and in a first approximation here, the glass transition temperatures of the microgels rise proportionally with the degree of crosslinking. In the case of weakly crosslinked microgels, the glass transition temperatures are higher by only about 1° C. than for the corresponding homo- or copolymers. In the case of highly crosslinked microgels, the glass transition temperatures can be higher by up to 10° C. than the glass transition temperatures of the corresponding non-crosslinked homo- or copolymers. In a first approximation, the affect on $T_g$ of the monomer (D) containing (a) hydroxy group(s) is negligible.

The glass transition temperatures of the gels produced by the process are usually in the range from −78° C. to 150° C., preferably from −78° C. to 125° C.

The gel content and the swelling index of the gel is established via the amount of crosslinking monomer (C), and also via the amount of regulator (which is described in more detail below), the conversion in the polymerisation reaction and the polymerisation temperature. Gel contents of from 10 to 100% by weight can be achieved as a function of the selection and amount of the crosslinking agent. However, preferred gel contents are above 70% by weight, particularly above 75% by weight, in particular above 80% by weight.

The swelling indices of the resultant microgels are generally below 30, preferably below 25, particularly preferably below 20.

Content of hydroxy groups is determined by reacting acetic anhydride with the dried microgels isolated from the latex, and subsequent KOH titration of the resultant liberated acetic acid, to DIN 53240. KOH consumption is equivalent to the hydroxy content of the gels and is termed hydroxy number with dimension mg KOH/g of polymer.

The hydroxy number of the resultant microgels is generally from 0.5 to 200, in particular from 1 to 150, preferably from 5 to 100, in each case per g of dry microgel.

Activators

Suitable polymerisation initiators are compounds which decompose to give free radicals. Among these are compounds which contain an —O—O— unit (peroxo compounds) or else an —N=N— unit (azo compound). Among the peroxo compounds are hydrogen peroxide, peroxodisulphates, peroxodiphosphates, perborates, hydroperoxides, peracids, peresters and peroxides. Suitable peroxodisulphates are sodium, potassium and ammonium peroxodisulphate. Suitable hydroperoxides are tert-butyl hydroperoxide, cumyl hydroperoxide and p-menthane hydroperoxide. Suitable peroxides are benzoyl peroxide, 2,4-dichlorobenzoyl peroxide, tert-butyl perbenzoate, dicumyl peroxide and di-tert-butyl peroxide. Suitable azo compounds are azobisisobutyronitrile, azobisvaleronitrile and azobiscyclohexanenitrile.

Hydrogen peroxide, hydroperoxides, peracids, peresters, peroxodisulphate, peroxodiphosphate and perborate can also be used in combination with reducing agents, e.g. dithionite, sulphenates, sulphinates, sulphoxylates, sulphite, metabisulphite, disulphite, sugars, urea, thiourea, xanthogenates, thioxanthogenates, hydrazinium salts and perthiocarbonate.

Activator systems obtained by combining an oxidant with a reducing agent are termed redox systems. Catalysts also added to these redox systems are salts of transition metal compounds, e.g. iron, cobalt or nickel, in combination with suitable complexing agents, such as sodium ethylenediammoniumtetraacetate, sodium nitrilotriacetate, and also potassium diphosphate. The aim of using the complexing agents is that the transition metal salt remains dissolved even when the environment is alkaline. One preferred redox system is composed of p-menthane hydroperoxide, sodium formaldehydesulphoxylate, iron(II) sulphate and sodium ethylenediaminoacetate.

The amount of polymerisation initiator is generally from 0.001 to 10 parts by weight, in particular from 0.5 to 10 parts by weight, preferably from 1 to 6 parts by weight, based in each case on 100 parts by weight of monomers used. The molar amount of reducing agent is preferably from 50% to 500%, particularly preferably from 60% to 400%, in particular from 70 to 300%, based in each case on the molar amount of the oxidant used.

The molar amount of complexing agent is based on the amount of transition metal used and can be up to ten times the equimolar amount.

The reaction rate is controlled via the amount of the polymerisation initiator.

In order to establish the desired reaction rate, it is preferable to add all, or else some, of the components of the initiator system in portions. It is preferable that 30% of the reducing agent in combination with iron and with complexing agents, together with 30% of the oxidant are added to the reactor at the start of the polymerisation reaction. In this case, the remaining amounts of reducing agent and of oxidants are added in portions or continuously to the reaction mixture. It is possible to use the rate of addition of the activator components to control the reaction rate within certain limits.

Regulators

Examples of regulators that can be used are linear and branched mercaptans, xanthogen disulphides, thioglycols, thiuram disulphides, halogenated hydrocarbons and branched hydrocarbons.

The mercaptans preferably have from 6 to 20 carbon atoms.

Examples of suitable mercaptans are n-hexyl mercaptan, n-dodecyl mercaptan, 2,4,4'-trimethylpentane-2-thiol, 2,2',4, 6,6'-pentamethylheptane-4-thiol, 2,2',6,6'-tetramethylheptane-4-methanethiol and 2,2',4,6,6',8,8'-heptamethylnonane-4-thiol.

Examples of xanthogen disulphides are dimethylxanthogen disulphide, diethylxanthogen disulphide and diisopropylxanthogen disulphide.

Examples of thiuram disulphides are tetramethylthiuram disulphide, tetraethylthiuram disulphide and tetrabutylthiuram disulphide.

Examples of halogenated hydrocarbons are carbon tetrachloride, ethyl bromide and methyl iodide.

Examples of branched hydrocarbons are those from which it is easy to cleave an H radical, e.g. pentaphenylethane, 2,4-diphenyl-4-methyl-1-pentene, dipentene, and also terpenes, such as α-terpene and γ-terpene.

Preference is given to tert-dodecyl mercaptan mixtures based on triisobutene and tetrapropene, these being available by way of example from Lanxess Deutschland GmbH or from Chevron Phillips.

If regulator is used, its preferred amount is up to 2.50 parts by weight, particularly up to 2.00 parts by weight, in particular up to 1.00 part by weight, based in each case on 100 parts by weight of the monomer mixture.

Conversion in the Polymerisation Reaction

The conversions obtained by the process of the invention in the polymerisation reaction are generally from 65 to 100%, preferably from 70 to 100%, particularly preferably from 80 to 100%. The high conversions in the polymerisation reaction are advantageous for achieving the following objectives:

1. high space/time yields of microgel;
2. reduction in thermal stress in the removal of unconverted monomers by steam stripping; and
3. establishment of high degrees of gel crosslinking, with gel contents above 70% by weight and swelling indices smaller than 30.

Other Constituents of a Polymerisation Mixture

Amount of Water

The amount of water used in the emulsion polymerisation reaction is preferably from 150 to 900 parts by weight, particularly preferably from 180 to 700 parts by weight, in particular from 200 to 400 parts by weight, based in each case on 100 parts of the monomer mixture.

Salt Additions

In order to reduce viscosity during the polymerisation reaction, salts of monovalent cations, such as sodium, potassium and ammonium, can be added to the aqueous phase. The corresponding anions can be mono- or divalent. Examples of the electrolytes used are sodium chloride, potassium chloride, ammonium chloride, sodium sulphate, potassium sulphate, ammonium sulphate, sodium nitrate, potassium nitrate and ammonium nitrate. Potassium chloride is preferred. The amount added of the salts is preferably from 0.01 to 1.0 part by weight, with preference from 0.05 to 0.25 part by weight, based in each case on 100 parts by weight of the monomer mixture.

Stoppers

It is generally possible to use hydroxylamine, dialkylhydroxylamine and hydrazine, or else the salts derived therefrom, to terminate the polymerisation reaction.

Specific examples of stoppers are hydroxyammonium sulphate, diethylhydroxylamine, diisopropylhydroxylamine, and also hydrazinium sulphate. Other terminators that can be used are sodium dimethyldithiocarbamate, hydroxydithiocarboxylic salts, hydroquinone, aromatic phenols, such as tert-butylpyrocatechol, perthiocarbonate and phenothiazine. It is preferable to use terminator agents which are nitrosamine-free and comprise no constituents that can be nitrosated.

The amount added of the stopper is preferably from 0 to 2.5 parts by weight, particularly preferably from 0.05 to 2.00 parts by weight, in particular from 0.10 to 0.50 part by weight, based in each case on 100 parts by weight of monomer mixture.

However, since the gel is produced via polymerisation to high conversions, and since the gels have high insoluble content, and also low degrees of swelling in toluene, it is not absolutely essential to terminate the polymerisation reaction, and termination can also be omitted for the purposes of the present invention.

Removal of Residual Monomers after the Polymerisation Reaction

Once the polymerisation reaction has been concluded, the resultant latex is steam-treated in order to remove unconverted monomers and also volatile constituents. Temperatures used here are preferably from 70 to 150° C., and at temperatures below 100° C. here, the pressure is reduced.

Prior to removal of the volatile constituents, emulsifier can be used for post-stabilisation of the latex.

If an emulsifier is used for post-stabilisation, the rules described above apply.

It is also possible to use the emulsifier system of the invention as emulsifier for post-stabilisation.

The amounts used here of the abovementioned emulsifiers are advantageously from 0 to 2.5% by weight, preferably from 0 to 1.5% by weight, based in each case on the monomer mixture initially used.

Addition of Antioxidants

Prior to or during coagulation of the latex, antioxidants are added to the latex. Phenolic and aminic antioxidants are suitable for this purpose. Suitable phenolic antioxidants are alkylated phenols or else sterically hindered phenols, e.g. 2,6-di-tert-butylphenol, 2,6-di-tert-butyl-p-cresol (BHT), 2,6-di-tert-butyl-4-ethylphenol, and also 2,2-methylenebis(4-methyl-6-tert-butylphenol) (BPH). Preference is given to BHT and BPH.

If discoloration of the gels is not important, it is also possible to use aminic antioxidants based on phenylenediamine. Examples are N-isopropyl-N'-phenyl-p-phenylenediamine (IPPD), N-1,3-dimethylbutyl-N'-phenyl-p-phenylenediamine (6PPD), N-1,4-dimethylpentyl-N'-phenyl-p-phenylenediamine (7PPD) and N,N'-bis-1,4-(1,4-dimethylpentyl)-p-phenylenediamine (77PD). Preference is given to the aminic antioxidants mentioned. Aminic antioxidants are preferably used when the hydroxy-modified gels are used for the production of tyres.

The amount of antioxidants added is usually in the range from 0.1 to 2.5% by weight.

Coagulation of the Latex

The latex is usually coagulated via electrolytes, which can also be used in combination with polymeric precipitants. Given compliance with the temperature criteria described at a later stage below, it is easy to obtain crumb sizes greater than 5 mm when coagulating the latex, by using salts of resin acids and of fatty acids, without addition of any anionic, cationic or neutral emulsifiers.

For the purposes of the present invention, electrolytes are in particular acids and salts. Examples of acids that can be used are hydrochloric acid, nitric acid, sulphuric acid, formic acid and acetic acid. Preference is given to sulphuric acid and acetic acid. Salts used are the salts of mono-, di- and trivalent metals. The corresponding anions of the salts are mono- and divalent. Examples of the electrolytes used are sodium chloride, potassium chloride, sodium sulphate, potassium sulphate, sodium nitrate, potassium nitrate, sodium sulphate, potassium sulphate, magnesium chloride, magnesium sulphate, calcium chloride, aluminium sulphate, and alums, such as potassium aluminium sulphate or sodium aluminium sulphate. Preference is given to sodium chloride, sodium sulphate, magnesium chloride, magnesium sulphate, calcium chloride, aluminium sulphate and alums, such as potassium aluminium sulphate or sodium aluminium sulphate.

It is also possible to use combinations of acids and salts. Preferred combinations are sodium chloride/sulphuric acid, magnesium sulphate/sulphuric acid, calcium chloride/acetic acid, potassium aluminium sulphate/sulphuric acid, and also aluminium sulphate/sulphuric acid.

The amounts of electrolyte needed for coagulation of the latex are generally from 0.1 to 100% by weight, preferably from 0.2 to 50% by weight, particularly preferably from 0.5 to 10% by weight, of electrolyte, based in each case on the microgel.

Polymeric precipitants can be non-ionic, anionic, cationic, or zwittterionic. They are not used alone, but rather in combination with the abovementioned electrolytes.

Examples of non-ionic polymeric precipitants are polyethylene oxide, ethylene oxide adducts onto (alkyl)phenol/formaldehyde condensates, polyoxypropylene, polyoxypropylene adducts onto (alkyl)phenol/formaldehyde condensates, copolymeric adducts of ethylene and propylene oxide onto (alkyl)phenol/formaldehyde condensates, and also onto fatty acids, block copolymers based on polyethylene oxide and polypropylene oxide, polyvinylpyrrolidone, cellulose derivatives, as described in DE 2 332 096 A, DE 2 425 441 A and DE 2 751 786 A, gelatine, fully or partially hydrolysed polyvinyl acetate, and also polysaccharides, as described in DE 3 043 688 A.

Examples of anionic polymeric precipitants are the salts of polyacrylic acids.

Cationic polymeric precipitants are usually based on poly(meth)acrylamide, or else on copolymers of epichlorohydrin and of dialkylamines, such as dimethylamine, as described in U.S. Pat. No. 4,920,176.

Preferred polymeric precipitants are block-copolymeric adducts of ethylene oxide and propylene oxide onto phenol/formaldehyde resins, where the cloud point of these is from 10 to 100° C., preferably from 20 to 70° C., as described in EP 0 779 301 A, and also cellulose-based water-soluble polymers.

The amounts of polymeric precipitants are from 0.01 to 5 parts by weight, preferably from 0.05 to 2 parts by weight, in each case based on 100 parts by weight of the microgel.

Coagulation of the latex is carried out in the temperature range from 10 to 150° C., preferably at temperatures which are above the glass transition temperature ($T_g$) by from 10 to 20° C. In order to produce adequately coarse crumb with dimensions above 5 mm, the coagulation temperature should preferably be higher than the glass transition temperature of the microgel by at least 10° C., with preference by at least 15° C., particularly by at least 20° C.

The amount of ater used for the washing process is generally from 0.5 to 50 parts by weight, preferably from 1 to 20 parts by weight, particularly preferably from 2 to 10 parts by weight, in each case based on 100 parts by weight of microgel.

The wash water used can be either deionised or non-deionised water.

The temperature of the wash water is preferably identical to the temperature used in the coagulation of the latex.

The wash process can be carried out continuously or batchwise. It is preferable that the process used for washing the crumb is one in which the wash is carried out continuously in a countercurrent process.

Methods of Analysis

Shear stability is determined on the latex after termination and after steam-treatment to remove residual monomers and other volatile constituents. The latex comprises only the emulsifiers used during the polymerisation reaction. The latex also has no added antioxidants.

Two methods were used to determine latex stability:
1) Monitoring of latex diameter as a function of latex storage time at room temperature.
2) Determination of shear stability as a function of latex storage time at room temperature.

To determine shear stability, the latex was first filtered through a filter with 50 µm mesh width. The solids concentration of the latex was then determined. For each determination of shear stability, 80±0.5 g of latex were added to a glass beaker with internal diameter of 58 mm and height 144.5 mm, without any adjustment of the pH or the solids concentration of the latex. Shear was applied to the latex by means of an Ultraturrax T 18 Basic from IKA® Werke GmbH & Co. KG, using a serrated mixer disc with diameter 16.9 mm. The distance between the lower edge of the stirrer disc and the base of the beaker was 12.7±3 mm. To determine shear stability, the latex was exposed to rotation at 14 000±200 rpm for 10 min at room temperature. The amount of coagulate formed during the shear process was then determined. For this, the latex was filtered through a filter with 50 µm mesh width. The coagulate removed by filtration was isolated and dried to constant weight at 60° C. in a vacuum oven. The amount of coagulate was based on the amount of solids present in the latex prior to exposure to shear. The following equations were used to calculate the percentage amount of coagulate formed:

$$\text{Amount of solids [g]} = \frac{\text{Amount of latex [g]} \times \text{Concentration of latex [\% by wt.]}}{100\%}$$

$$\text{Amount of coagulate [\%]} = \frac{\text{Amount of dry coagulate [g]}}{\text{Amount of solids [g]}} \times 100\%$$

A latex has adequate shear stability if the amount of coagulate formed during the said determination is smaller than 5% by weight.

In the case of non-inventive lattices of experimental series (1) it is clear that the amount of coagulate formed during shear of the latex correlates with the increase in particle size during latex storage.

The diameter of the latex particles was determined as a function of the latex storage time, on a filtered latex (sieve mesh width: 50 µm) by means of dynamic light scattering (DLS). A Zetasizer° (Nano ZS) from Malvern Instruments Ltd., Worcestershire, England was used for the measurements. For each measurement, a 1 ml plastics pipette was used to add one drop of the latex to be studied to a measurement cell to which deionised water had been charged. The resultant diluted latex was shaken two or three times for homogenisation.

It was found that the diameter of the latex particles, determined by dynamic light scattering, increases during storage of the latex. During the course of the work it was apparent that a latex has adequate stability while the diameter of the particles is smaller than 100 nm. Latex stability is inadequate when particle diameters are from 100 to 170 nm. Diameters above 170 nm were not observed, since the latex had already undergone complete coagulation. On the basis of these observations, if a latex is to be resistant to shear and stable in storage, only a small change in its particle size is permissible, as a function of standing time. For achievement of adequate storage stability, particle diameter must remain smaller than 100 nm even when the standing time of the latex is more than 4 weeks.

To determine content of insoluble polymer fractions (gel content) and swelling index, 250 mg of polymer are swollen in 25 ml of toluene for 24 hours at 23° C., with shaking. The toluene-swollen (wet) gel ($MG_{wet}$) is then isolated by centrifuging at 20 000 rpm and weighed, and then dried to constant weight at 70° C. and again weighed ($MG_{dry}$).

Gel content corresponds to the fraction insoluble in toluene at 23° C. It is calculated from the following formula:

$$\text{Gel content [\%]} = \frac{MG_{dry}}{250} \times 100$$

Swelling index (SI) is calculated from the following formula:

$$SI = \frac{MG_{wet}}{MG_{dry}}$$

Gel content and swelling index depend in particular on the nature and amount of the crosslinking monomer (C), on the amount of regulator and on the conversion in the polymerisation reaction. Gel content is preferably more than 70% by weight, particularly preferably more than 75% by weight, in particular more than 80% by weight. Swelling index is preferably less than 30, preferably less than 25.

Glass transition temperature ($T_g$) was determined by means of DSC, using a Perkin-Elmer DSC-2. In the first measurement cycle, the specimen is cooled by liquid nitrogen at 320 K/min to −130° C. and heated at a heating rate of 20 K/min to 150° C. In the second measurement cycle, the specimen is again cooled to −130° C. and heated at 20 K/min. $T_g$ is determined in the 2nd measurement cycle.

The glass transition temperatures ($T_g$) of the microgels are in a range which is generally from −78 to 150° C., preferably from −78 to 120° C., particularly preferably from −75 to 125° C.

EXAMPLES

Production of Microgels

The following starting materials were used to produce the microgels (see experimental series (1) to (8)). All of the formulation constituents in the tables here are based on 100 parts by weight of the monomer mixture.

Monomers
[1] Butadiene (99% purity, without stabiliser) from Lanxess Deutschland GmbH
[2] Styrene (98% purity) from KMF Labor Chemie Handels GmbH
[3] Trimethylolpropane trimethacrylate (96% purity) from Aldrich; product number: 24684-0; (abbreviation: TMPTMA)
[4] Hydroxyethyl methacrylate (97% from Arcos; abbreviation: HEMA)

Emulsifiers
[5] Disproportionated resin acid (abbreviated to RA)—calculated as free acid based on the amount used of Dresinate® 835 (Abieta Chemie GmbH; D-86358 Gersthofen)

The Dresinate® 835 batch used was characterized via solids content and also via the emulsifier constituents present in the form of sodium salt, in the form of free acid and in the form of neutral material.

Solids content was determined to the specification published by Maron, S. H.; Madow, B. P.; Borneman, E.: "The effective equivalent weights of some rosin acids and soaps", Rubber Age, April 1952, 71-72.

The average solids content value determined from three aliquot specimens of the Dresinate® 835 batch used was 71% by weight.

The emulsifier fractions present in the form of sodium salt and in the form of free acid were determined titrimetrically by the method described by Maron, S. H., Ulevitch, I. N., Elder, M. E.: "Fatty and Rosin Acids, Soaps, and Their Mixtures, Analytical Chemistry", Vol. 21, 6, 691-695.

For the determination (in one example), an excess of sodium hydroxide solution (5 ml of 0.5N NaOH) was admixed with 1.213 g of Dresinate® 835 (71% strength) in a mixture of 200 g of distilled water and 200 g of distilled isopropanol, and the mixture was back-titrated with 0.5N hydrochloric acid. The course of the titration was followed by potentiometric pH measurement. The titration curve was evaluated as described in Analytical Chemistry, Vol. 21, 6, 691-695.

The average value obtained on three aliquot specimens of the Dresinate® 835 batch used was:

| | |
|---|---|
| Total emulsifier content: | 2.70 mmol/$g_{dry\ weight}$ |
| Na salt: | 2.42 mmol/$g_{dry\ weight}$ |
| Free acid: | 0.28 mmol/$g_{dry\ weight}$ |

The proportions by weight of Na salt, of free acid and of unrecorded fractions of the Dresinate® 835 batch used were calculated with the aid of the molar masses for the Na salt of disproportionated abietic acid (324 g/mol), and the molar mass of free disproportionated abietic acid (302 g/mol):

| | |
|---|---|
| Sodium salt of disproportionated resin acid: | 78.4% by weight |
| Free disproportionated resin acid: | 8.5% by weight |
| Unrecorded fractions (neutral material): | 13.1% by weight |

In the following formulations, the amounts of Dresinate® 835 used in the polymerisation reactions have been converted by calculation to free acid (abbreviated to RA) and stated as proportions by weight, based on 100 parts by weight of monomers. The neutral material has been ignored in this conversion calculation.

For comprehension of the conversion of the amounts, indicated in the table, of disproportionated abietic acid (RA) on the basis of the amounts of Dresinate 835® used, the following table is appended:

| Starting weight of Dresinate ® 835 [dry weight, g] | Calculated amount of disproportionated abietic acid (without neutral material) [dry weight, g] |
|---|---|
| 0.25 | 0.20 |
| 0.5 | 0.41 |
| 1.0 | 0.82 |
| 1.5 | 1.22 |
| 2.0 | 1.63 |
| 2.5 | 2.04 |
| 3.0 | 2.45 |
| 3.5 | 2.86 |
| 4.0 | 3.26 |
| 4.5 | 3.67 |
| 4.75 | 3.87 |
| 5.0 | 4.08 |

[6] Partially hydrogenated tallow fatty acid—abbreviated to FA (Edenor® HTiCT N from Cognis Oleo Chemicals)

Total emulsifier content and the average molecular weight of the batch of Edenor® HTiCT N used were determined titrimetrically with the aid of the following methods: Maron, S. H., Ulevitch, I. N., Elder, M. E.: "Fatty and Rosin Acids, Soaps, and Their Mixtures, Analytical Chemistry", Vol. 21, 6, 691-695; Maron, S. H.; Madow, B. P.; Borneman, E.: "The effective equivalent weights of some rosin acids and soaps", Rubber Age (1952), 71-2). In the titration process (in one example), an excess of 15 ml of NaOH (0.5 mol/l) was admixed with 1.5 g of Edenor® HTiCT N in a mixture of 200 g of distilled water and 200 g of distilled isopropanol, and the mixture was back-titrated with 0.5N hydrochloric acid.

The average value obtained here from three aliquot portions of the batch of Edenor® HTiCT N used was:

| Total emulsifier content: | 3.637 mmol/$g_{dry\ weight}$ |
|---|---|
| Molar mass (free acid): | 274.8 mg/mmol |

In the following formulations, the amounts used of partially hydrogenated tallow fatty acid (in the form commercially available) have been stated in the form of "free acid=FA".

The amounts needed to achieve the degrees of neutralisation stated in the tables were calculated on the basis of the amounts deter mined titrimetrically of the various constituents of the batches used of Dresinate® 835 and Edenor® HTiCT N. The degrees of neutralisation in all of the examples of experimental series (1) to (8) were achieved using potassium hydroxide.

Regulators

[7)] tert-Dodecyl mercaptan from Chevron Phillips Chemical Company LP (Sulfole® 120)

[8)] tert-Dodecyl mercaptan from Lanxess Deutschland GmbH

The microgels were produced via emulsion polymerisation in a 20 l autoclave with agitator. In the case of the polymerisation mixtures described in experimental series (1), 2.15 kg of monomers were used with 0.17 g of 4-methoxyphenol (Arcos Organics, Product No. 126001000, 99%). In the case of the polymerisation mixtures described in experimental series (2) to (8), 4.3 kg of monomers were used in each case with 0.34 g of 4-methoxyphenol (Arcos Organics, Product No. 126001000, 99%). The total amounts of emulsifier and of water stated in the tables (after deducting the amounts of water needed—see below—for producing the aqueous premix solutions and p-menthane hydroperoxide solutions) were in each case used as initial charge together with the emulsifiers and with the amounts of potassium hydroxide needed to achieve the degrees of neutralisation stated in Tables 1 to 8.

In the case of the polymerisation mixtures listed in experimental series (1), once the reaction mixture had been heated to 30° C., in each case 50% of freshly produced aqueous premix solutions (4% strength) were added to the autoclave. The said premix solutions were composed of:

| | |
|---|---|
| 0.284 g | of ethylenediaminetetraacetic acid (Fluka, product number 03620), |
| 0.238 g | of iron(II) sulphate * 7H$_2$O (Riedel de Haen, product number 12354) (calculated without water of crystallisation) |
| 0.576 g | of Rongalit C, Na formaldehyde-sulphoxylate dihydrate (Merck-Schuchardt, product number 8.06455) (calculated without water of crystallisation), and |
| 0.874 g | of trisodium phosphate * 12H$_2$O (Acros, product number 206520010) (calculated without water of crystallisation). |

For activation of the polymerisation reactions listed in experimental series (1), a total amount of 1.4 g of p-menthane hydroperoxide (Trigonox NT 50 from Akzo-Degussa) was used, emulsified in 200 ml of the emulsifier solution produced in the reactor. 50% of the said emulsion (0.7 g of Trigonox NT 50) was used to initiate the polymerisation reaction.

On achievement of 30% conversion, the remaining 50% of the premix solution, and also of the p-menthane hydroperoxide emulsion, were metered in.

In the case of experimental series (2) to (8), the amount added of the said components to the reactor, both at the beginning of the polymerisation reaction and on achievement of 30% conversion in the polymerisation reaction, was twice that in experimental series (1).

The temperature profile during the polymerisation reaction was achieved by adjusting the amount of coolant and the temperature of the coolant within the temperature ranges stated in the tables.

Once the conversion achieved in the polymerisation reaction was more than 85% (usually: from 90% to 100%), the polymerisation reaction was terminated by adding an aqueous solution of 2.35 g of diethylhydroxylamine (DEHA, Aldrich, product number 03620).

Removal of Volatile Constituents

The latex was subjected to steam distillation at atmospheric pressure in order to remove volatile constituents.

Prior to coagulation of the latex, a 50% strength dispersion of Vulkanox® KB (1.25% by weight of Vulkanox® KB, based on solids) was added as antioxidant to the latex. The Vulkanox® KB dispersion was composed of:

| | |
|---|---|
| 360 g | of deionised water (DW) |
| 40 g | of alkylphenol polyglycol ether (NP10 emulsifier from Lanxess Deutschland GmbH |
| 400 g | of Vulkanox ® KB from Lanxess Deutschland GmbH |

The Vulkanox ® KB dispersion was produced with the aid of an Ultraturrax at from 95 to 98° C.

Coagulation and Work-Up of the Latex

The lattices of experimental series (1) to (8) were coagulated batchwise in an open 55 L tank with basal valve, with facilities for heating and stirring. In each case, coagulation of the latex used 16 L of latex with the solids concentrations stated in the tables and 15 L of precipitant liquor. The precipitant liquor was composed of deionised water in which the amount of dissolved calcium chloride was sufficient to give an amount of 1.77% by weight of calcium chloride, based on microgel (solids) in each coagulation of the latex. The coagulation of the latex was achieved by adding the latex, with stirring, to the heated precipitant solution. Once the latex had been added, the cooled contents of the tank were heated to the temperature of the precipitant prior to latex addition, and maintained at the said temperature until the serum became clear (from 10 to 15 min).

The temperature to which the precipitant solution was heated prior to latex addition depended on the glass transition temperature of the microgel. In the experiments where the glass transition temperature of the microgel was <0° C., it was sufficient to heat the precipitant solution to 50° C. in order to obtain adequately coarse microgel crumb with a diameter of about 5 mm.

In experimental series (5) to (8), and also in experiment 16 (series 3), lattices with microgel glass transition temperatures >0° C. were obtained. In order to obtain crumb with diameters >5 mm during coagulation of these microgel lattices, the precipitant solution had to be heated to a temperature which was above the corresponding glass transition temperature of the microgel by ≧15° C., before the corresponding microgel latex was added to the precipitant solution.

In the case of coagulation of the latex ($T_g$=62° C.) resulting from experiment 16* (experimental series 3) with aqueous calcium chloride solution, the crumb obtained at 60° C. and 70° C. had an inadequate size smaller than 2 mm. At 75° C., crumb size was in the range from 2 to 5 mm. At coagulation temperature 80±2° C., crumb size was greater than 5 mm.

In the case of coagulation of the latex ($T_g$=103.5° C.) resulting from experiment 49* (experimental series 8) with aqueous calcium chloride solution, the only product obtained at precipitant-liquor temperatures from 95 to 98° C. was crumb with inadequate size of up to 2 mm.

After clarification of the serum, 20 L of deionised water were admixed with the dispersion of the crumb, and the mixture was allowed to stand, without stirring. After from 15 to 30 minutes, the dispersion of the crumb formed a cream (except in the case of experiment 49*). The serum was discharged by way of a basal valve. The crumb remaining in the tank was then slurried with 40 L of deionised water (25° C.), with stirring. Once the cream had formed, the crumb was separated from the wash water by using a sieve with mesh width of 2 mm, subjected to preliminary mechanical dewatering to give a residual moisture level of from 20 to 30%, and dried batchwise in a vacuum oven at 70° C. in a stream of air to give a residual moisture level of ≦0.5% by weight.

Coagulation of the latex of experiment 49* gave crumb which after addition of 20 L of deionised water, in contrast to the other experiments, did not form a cream but instead formed a sediment. In this experiment, the supernatant latex serum was withdrawn. The wash took place as in the other experiments via slurrying with 40 L of deionised water at 25° C. A 2 mm sieve was used to isolate the crumb from the wash water. The further work-up of the crumb was as described above.

The following indices are used in the tables below:
[1] Butadiene (unstabilised)
[2] Styrene (stabilised with from 100 to 150 ppm of 4-tert-butylpyrocatechol)
[3] Trimethylolpropane trimethacrylate (96% purity from Aldrich)
[4] Hydroxyethyl methacrylate (97% purity from Arcos)
[5] Amount of disproportionated resin acid (abbreviated to RA) calculated from the amount of Dresinate 835 used
[6] Edenor HTiCT N from Oleo Chemicals (abbreviated to FA)
[7] tert-Dodecyl mercaptan (Sulfole® 120 from Chevron Phillips)
[8] tert-Dodecyl mercaptan (Lanxess Deutschland GmbH)

Examples according to the invention have been denoted with "*" below.

Experimental series (1): Effect of amount of HEMA on latex storage time (comparative examples not according to the invention)

| Product | Monomers [parts by weight] | | | | Emulsifiers [phm] | | | | Degree of neutralisation [%] | Water [phm] | Polymerisation temperature [° C.] | Polymerisation time [min] | Conversion [%] |
|---|---|---|---|---|---|---|---|---|---|---|---|---|---|
| | Butadiene[1] | Styrene[2] | TMPTM[3] | HEMA[4] | RA[5] | FA[6] | RA/FA | RA + FA | | | | | |
| 1 | 44.5 | 54 | 1.5 | 0 | 3.87 | 0.22 | 17.59 | 4.09 | 114 | 400 | 30-36 | 330 | 100 |
| 2 | 45.5 | 45.5 | 1.5 | 7.5 | 3.87 | 0.22 | 17.59 | 4.09 | 114 | 400 | 30-34 | 360 | 90.5 |
| 3 | 46.0 | 42.5 | 1.5 | 10 | 3.87 | 0.22 | 17.59 | 4.09 | 114 | 400 | 30-34 | 370 | 90.5 |

Results:

| Product | Solids content (after monomer removal) [% by wt.] | pH of latex (after monomer removal) | Gel content [% by wt.] | S Index | Acid number [mg KOH/g of microgel] | OH number | $T_g$ [° C.] | Particle diameter [nm] as a function of storage time in weeks | | | | | Amount of coagulate on exposure to shear [% by weight] as a function of storage time in weeks | | | | |
|---|---|---|---|---|---|---|---|---|---|---|---|---|---|---|---|---|---|
| | | | | | | | | 0 | 3 | 6 | 8 | 12 | 0 | 3 | 6 | 8 | 12 |
| 1 | 20.0 | 11.1 | 63.3 | 11.7 | 6.2 | 7.7 | −22.5 | 65 | 67 | 66 | 65 | 63 | 0.25 | 0.22 | 0.55 | 0.75 | 1.0 |
| 2 | 18.6 | 7.6 | 92.1 | 7.9 | 5.4 | 25.0 | −14.5 | 65 | 105 | 136 | 166 | coag. | 0.42 | 5.0 | 6.8 | 19.8 | coag. |
| 3 | 18.6 | 7.9 | 94.2 | 10.9 | 6.2 | 32.6 | −15.5 | 73 | 120 | 218 | coag. | coag. | 0.27 | 15.4 | coag. | coag. | coag. |

In experimental series (1), the comparative examples not according to the invention show that, unlike in the HEMA-free reference experiment 1, when the amounts used of HEMA are more than 5 parts by weight (based on the composition of the monomer) the resultant latex storage times (experiments 2 and 3) are inadequate (less than 3 weeks) when the polymerisation reaction is carried out at temperatures above 30° C. to conversions of more than 90% in polymerisation times of less than 7 hours, and the polymerisation reaction uses disproportionated resin acid and partially hydrogenated tallow fatty acid in a ratio of 17.6/1 by weight with a degree of neutralisation of 114%.

Experimental series (2): Effect of degree of neutralisation of resin acid and of fatty acid on latex stability
(Examples according to the invention: 5*, 6*, 7* and 8*)

| Product | Monomers [parts by weight] | | | | Emulsifiers [phm] | | | | Degree of neutralisation [%] | Water [phm] | Polymerisation temperature [° C.] | Polymerisation time [min] | Conversion [%] |
|---|---|---|---|---|---|---|---|---|---|---|---|---|---|
| | Butadiene[1] | Styrene[2] | TMPTM[3] | HEMA[4] | RA[5] | FA[6] | RA/FA | RA + FA | | | | | |
| 4 | 38 | 53 | 1.5 | 7.5 | 3.67 | 0.44 | 8.34 | 4.11 | 103 | 200 | 30-34 | 475 | 85.6 |
| 5* | 38 | 53 | 1.5 | 7.5 | 3.67 | 0.44 | 8.34 | 4.11 | 106 | 200 | 30-34 | 330 | 92.0 |
| 6* | 38 | 53 | 1.5 | 7.5 | 3.67 | 0.44 | 8.34 | 4.11 | 114 | 200 | 30-33 | 420 | 90.5 |
| 7* | 38 | 53 | 1.5 | 7.5 | 3.67 | 0.44 | 8.34 | 4.11 | 123 | 200 | 30-32 | 360 | 92.0 |

-continued

Experimental series (2): Effect of degree of neutralisation of resin acid and of fatty acid on latex stability
(Examples according to the invention: 5*, 6*, 7* and 8*)

| | | | | | | | | | | | | | |
|---|---|---|---|---|---|---|---|---|---|---|---|---|---|
| 8* | 38 | 53 | 1.5 | 7.5 | 3.67 | 0.44 | 8.34 | 4.11 | 145 | 200 | 30-32 | 405 | 91.7 |
| 9 | 38 | 53 | 1.5 | 7.5 | 3.67 | 0.44 | 8.34 | 4.11 | 168 | 200 | 30-32 | 360 | 88.6 |

Results:

| Product | Solids content (after monomer removal) [% by wt.] | pH of latex (after monomer removal) | Gel content [% by wt.] | S Index | Acid number | OH number | $T_g$ [° C.] | Particle diameter in [nm] as a function of storage time in weeks | | | | | |
|---|---|---|---|---|---|---|---|---|---|---|---|---|---|
| | | | | | [mg KOH/g of microgel] | | | 0 | 1 | 3 | 4 | 6 | 8 |
| 4 | 29.1 | 7.9 | 94 | 12.6 | 6.9 | 21.4 | -3 | 89 | 91 | 96 | 122 | 138 | 152 |
| 5* | 29.0 | 8.2 | 91.2 | 10.3 | 4.9 | 24.9 | -4.5 | 71 | 73 | 77 | 82 | 104 | 138 |
| 6* | 29.2 | 8.1 | 94.3 | 13.3 | 5.1 | 19.5 | -5 | 85 | 82 | 85 | 92 | 105 | 122 |
| 7* | 34.0 | 8.2 | 94.7 | 11.5 | 4.9 | 19.3 | -.5 | 79 | 79 | 82 | 96 | 112 | 118 |
| 8* | 32.0 | 8.4 | 94.6 | 14.0 | 5.4 | 19.4 | -5 | 83 | 83 | 91 | 98 | 124 | 138 |
| 9 | 30.3 | 8.4 | 95.2 | 11.9 | 6.0 | 20.6 | -5 | 85 | 86 | 107 | 127 | 152 | 163 |

In experimental series (2), examples 5*, 6*, 7* and 8* according to the invention (denoted with "*") show that the resultant latex storage times are greater than 4 weeks if the ratio of disproportionated resin acid to partially hydrogenated fatty acid is 8.34/1 and the degree of neutralisation of resin acid and of fatty acid is from 106% to 145%. If the degree of neutralisation of resin acids and of fatty acids is <104% or >165%, inadequate latex stabilities are obtained.

In experimental series (3), the examples according to the invention show that the maximum latex storage times are almost independent of the nature and amount of the mercaptan used, given compliance with the following: the ranges according to the invention for the total amount of disproportionated resin acid and of partially hydrogenated fatty acid (4.11 parts by weight per 100 parts by weight of monomer), the ratio by weight of disproportionated resin acid to partially hydrogenated fatty acid (8.3/1) and the degree of neutralisation of the disproportionated resin acid and partially hydrogenated fatty acid (123%).

Experimental series (3): Effect of amount of mercaptan on stability of the latex during storage (examples according to the invention)

| Product | tert-DDM [phm] 7) | tert-DDM [phm] 8) | Monomers [parts by weight] Buta-diene[1) | Monomers [parts by weight] Sty-rene[2) | TMPTM[3) | HEMA[4) | Emulsifiers [phm] RA[5) | Emulsifiers [phm] FA[6) | RA/ FA | RA + FA | Degree of neutralisation [%] | Water [phm] | Poly- merisation temperature [° C.] | Poly- merisation time [min] | Con- ver- sion [%] |
|---|---|---|---|---|---|---|---|---|---|---|---|---|---|---|---|
| 10* | — | — | 91 | — | 1.5 | 7.5 | 3.67 | 0.44 | 8.34 | 4.11 | 123 | 300 | 30-32 | 360 | 97 |
| 11* | 0.10 | — | 91 | — | 1.5 | 7.5 | 3.67 | 0.44 | 8.34 | 4.11 | 123 | 300 | 30-32 | 300 | 100 |
| 12* | — | 0.20 | 91 | — | 1.5 | 7.5 | 3.67 | 0.44 | 8.34 | 4.11 | 123 | 300 | 30-32 | 300 | 95.5 |
| 13* | 0.25 | — | 44.5 | 46.5 | 1.5 | 7.5 | 3.67 | 0.44 | 8.34 | 4.11 | 123 | 400 | 30-35 | 240 | 97 |
| 14* | — | 0.5 | 44.5 | 46.5 | 1.5 | 7.5 | 3.67 | 0.44 | 8.34 | 4.11 | 123 | 400 | 30-38 | 220 | 98 |
| 15* | 0.85 | — | 44.5 | 46.5 | 1.5 | 7.5 | 3.67 | 0.44 | 8.34 | 4.11 | 123 | 400 | 30-40 | 200 | 96 |
| 16* | 0.85 | — | 10.5 | 80.5 | 4 | 5 | 3.67 | 0.44 | 8.34 | 4.11 | 123 | 400 | 30-35 | 180 | 95 |

Results:

| Product | Solids content (after monomer removal) [% by wt.] | pH of latex (after monomer removal) | Gel content [% by wt.] | S Index | Acid number | OH number | $T_g$ [° C.] | Particle diameter in [nm] as a function of latex storage time in weeks | | | | | |
|---|---|---|---|---|---|---|---|---|---|---|---|---|---|
| | | | | | [mg KOH/g of microgel] | | | 0 | 2 | 4 | 6 | 8 | 12 |
| 10* | 25.0 | 8.0 | 96.2 | 7.9 | 6.8 | 27.7 | -78 | 65 | 65 | 68 | 89 | 121 | 160 |
| 11* | 26.4 | 7.7 | 96.1 | 9.6 | 6.3 | 25.8 | -79 | 62 | 61 | 60 | 68 | 86 | 123 |
| 12* | 25.2 | 8.5 | 95.2 | 13.2 | 7.1 | 28.5 | -79 | 56 | 55 | 66 | 94 | 107 | 121 |
| 13* | 17.0 | 7.8 | 92 | 14.8 | 3.3 | 20.6 | -13 | 47 | 52 | 69 | 88 | 98 | 112 |
| 14* | 18.0 | 7.4 | 88 | 22.5 | 3.4 | 26.3 | -11.5 | 51 | 54 | 76 | 84 | 91 | 96 |
| 15* | 18.0 | 7.4 | 78 | 24.7 | 6.5 | 25.9 | -15 | 50 | 51 | 55 | 63 | 75 | 130 |
| 16* | 17.8 | 7.5 | 96 | 11.3 | 7.5 | 20.0 | 62 | 47 | 49 | 65 | 81 | 88 | 93 |

Experimental series (4): Effect of ratio by weight of resin acid and fatty acid on latex stability (examples according to the invention: 17*, 18*, 19*, 20*, 21*, 22* and 23*)

| Product | Monomers [parts by weight] | | | Emulsifiers [phm] | | | | Degree of neutralisation [%] | Water [phm] | Polymerisation temperature [°C.] | Polymerisation time [min] | Conversion [%] |
|---|---|---|---|---|---|---|---|---|---|---|---|---|
| | Butadiene[1] | TMPTM[3] | HEMA[4] | RA[5] | FA[6] | RA/FA | RA + FA | | | | | |
| 17* | 91 | 1.5 | 7.5 | 4.08 | 0 | — | 4.08 | 122 | 300 | 30-34 | 420 | 97.1 |
| 18* | 91 | 1.5 | 7.5 | 3.67 | 0.44 | 8.34 | 4.11 | 123 | 300 | 30-32 | 345 | 92.5 |
| 19* | 91 | 1.5 | 7.5 | 3.26 | 0.88 | 3.70 | 4.14 | 124 | 300 | 30-32 | 300 | 99.0 |
| 20* | 91 | 1.5 | 7.5 | 2.86 | 1.32 | 2.17 | 4.18 | 125 | 300 | 30-32 | 300 | 100 |
| 21* | 91 | 1.5 | 7.5 | 2.45 | 1.76 | 1.39 | 4.21 | 126 | 300 | 30-32 | 300 | 98.0 |
| 22* | 91 | 1.5 | 7.5 | 2.04 | 2.20 | 0.93 | 4.24 | 126 | 300 | 30-32 | 300 | 96.0 |
| 23* | 91 | 1.5 | 7.5 | 0 | 2.20 | — | 2.20 | 128 | 300 | 30-32 | 300 | 95.5 |

Results:

| Product | Solids content (after monomer removal) [% by wt.] | pH of latex (after monomer removal) | Gel content [% by wt.] | S Index | Acid number [mg KOH/g of microgel] | OH number [mg KOH/g of microgel] | $T_g$ [°C.] | Particle diameter in [nm] as a function of latex storage time in weeks | | | | | |
|---|---|---|---|---|---|---|---|---|---|---|---|---|---|
| | | | | | | | | 0 | 2 | 4 | 6 | 8 | 12 |
| 17* | 23.9 | 8.2 | 95.3 | 8.3 | 7.6 | 25.1 | −78 | 78 | 79 | 82 | 100 | 111 | 135 |
| 18* | 22.8 | 8.2 | 96.2 | 8.5 | 7.2 | 32.0 | −78.5 | 58 | 56 | 64 | 80 | 101 | 140 |
| 19* | 25.4 | 8.0 | 96.7 | 8.2 | 6.0 | 28.1 | −79 | 53 | 55 | 59 | 77 | 95 | 123 |
| 20* | 25.1 | 8.0 | 96.9 | 9.2 | 6.1 | 29.1 | −78.5 | 53 | 55 | 63 | 79 | 96 | 114 |
| 21* | 24.0 | 7.8 | 97.0 | 7.7 | 5.8 | 30.3 | −79 | 50 | 56 | 57 | 71 | 83 | 106 |
| 22* | 23.6 | 8.0 | 97.4 | 8.8 | 6.0 | 32.1 | −78 | 54 | 48 | 53 | 72 | 88 | 104 |
| 23* | 22.7 | 7.9 | 98.4 | 10.4 | 2.9 | 28.1 | −79 | 53 | 63 | 84 | 108 | 123 | 144 |

In experimental series (4), examples 17*, 18*, 19*, 20*, 21*, 22* and 23* according to the invention show that the resultant latex storage times are more than 6 weeks if the entirety of the resin acids and fatty acids is ≧2.20 parts by weight.

Experimental series (5): Effect of degree of neutralisation of resin acid and of fatty acid on latex stability (examples according to the invention)

| Product | Monomers [parts by weight] | | | | Emulsifiers [phm] | | | | Degree of neutralisation [%] | Water [phm] | Polymerisation temperature [°C.] | Polymerisation time [min] | Conversion [%] |
|---|---|---|---|---|---|---|---|---|---|---|---|---|---|
| | Butadiene[1] | Styrene[2] | TMPTM[3] | HEMA[4] | RA[5] | FA[6] | RA/FA | RA + FA | | | | | |
| 24* | 21 | 70 | 1.5 | 7.5 | 2.45 | 1.76 | 1.39 | 4.21 | 112 | 300 | 30-34 | 300 | 96 |
| 25* | 21 | 70 | 1.5 | 7.5 | 2.45 | 1.76 | 1.39 | 4.21 | 116 | 300 | 30-32 | 300 | 97 |
| 26* | 21 | 70 | 1.5 | 7.5 | 2.45 | 1.76 | 1.39 | 4.21 | 119 | 300 | 30-33 | 300 | 100 |
| 27* | 21 | 70 | 1.5 | 7.5 | 2.45 | 1.76 | 1.39 | 4.21 | 123 | 300 | 30-36 | 200 | 99 |
| 28* | 21 | 70 | 1.5 | 7.5 | 2.45 | 1.76 | 1.39 | 4.21 | 126 | 300 | 30-39 | 150 | 96 |
| 29* | 21 | 70 | 1.5 | 7.5 | 2.45 | 1.76 | 1.39 | 4.21 | 129 | 300 | 30-31 | 360 | 96 |
| 30* | 21 | 70 | 1.5 | 7.5 | 2.45 | 1.76 | 1.39 | 4.21 | 132 | 300 | 30-32 | 300 | 96 |
| 31* | 21 | 70 | 1.5 | 7.5 | 2.45 | 1.76 | 1.39 | 4.21 | 136 | 300 | 30-45 | 120 | 100 |
| 32* | 21 | 70 | 1.5 | 7.5 | 2.45 | 1.76 | 1.39 | 4.21 | 139 | 300 | 30-31 | 300 | 98 |

Results:

| Product | Solids content (after monomer removal) [% by wt.] | pH of latex (after monomer removal) | Gel content [% by wt.] | S Index | Acid number [mg KOH/g of microgel] | OH number [mg KOH/g of microgel] | $T_g$ [°C.] | Particle diameter in [nm] as a function of latex storage time in weeks | | | | | |
|---|---|---|---|---|---|---|---|---|---|---|---|---|---|
| | | | | | | | | 0 | 2 | 4 | 6 | 8 | 12 |
| 24* | 27.4 | 8.4 | 96.0 | 8.3 | 6.8 | 29.3 | 36.0 | 54 | 54 | 53 | 53 | 54 | 58 |
| 25* | 28.1 | 8.4 | 96.1 | 8.2 | 6.8 | 25.9 | 34.5 | 54 | 53 | 54 | 57 | 57 | 63 |
| 26* | 26.9 | 8.4 | 96.3 | 8.0 | 5.7 | 27.4 | 32.0 | 53 | 53 | 53 | 56 | 56 | 59 |
| 27* | 26.4 | 8.5 | 96.5 | 8.1 | 5.8 | 26.5 | 34.5 | 51 | 52 | 54 | 54 | 55 | 57 |
| 28* | 26.7 | 8.7 | 96.4 | 8.1 | 6.5 | 27.1 | 39.0 | 50 | 52 | 53 | 53 | 54 | 54 |
| 29* | 26.5 | 8.5 | 96.4 | 7.9 | 7.0 | 25.2 | 37.5 | 57 | 59 | 61 | 59 | 60 | 66 |
| 30* | 24.3 | 8.4 | 95.8 | 8.8 | 6.4 | 26.2 | 35.5 | 52 | 53 | 55 | 55 | 53 | 59 |

-continued

Experimental series (5): Effect of degree of neutralisation of resin acid and of fatty acid on latex stability (examples according to the invention)

| 31* | 26.3 | 8.2 | 96.3 | 8.4 | 6.2 | 26.2 | 29.0 | 56 | 58 | 53 | 53 | 62 | 62 |
| 32* | 24.5 | 8.3 | 97.0 | 8.1 | 6.1 | 25.7 | 39.0 | 59 | 60 | 55 | 53 | 61 | 64 |

In experimental series (5), the examples according to the invention show that the resultant lattices have adequate stability of more than 12 weeks if the degrees of neutralisation of the disproportionated resin acid and of the partially hydrogenated fatty acid are from 112 to 139%.

lattices are stable with latex storage times of more than 6 weeks if the total amount composed of disproportionated resin acid and of partially hydrogenated fatty acid is $\geq 2.20$ parts by weight, based on 100 parts by weight of the monomer mixture.

Experimental series (6): Effect of amount of emulsifier (total amount of resin acid and of fatty acid) on latex stability (examples according to the invention: 34*, 35*, 36*, 37*, 38* and 39*)

| | Monomers [parts by weight] | | | | Emulsifiers [phm] | | | | | Water | Polymerisation temperature | Polymerisation time | Conversion |
|---|---|---|---|---|---|---|---|---|---|---|---|---|---|
| Product | Butadiene[1] | Styrene[2] | TMPTM[3] | HEMA[4] | RA[5] | FA[6] | RA/FA | RA + FA | Degree of neutralisation [%] | [phm] | [° C.] | [min] | [%] |
| 33  | 21 | 70 | 1.5 | 7.5 | 1.22 | 0.88 | 1.39 | 2.10 | 120 | 300 | 30-34 | 300 | 95 |
| 34* | 21 | 70 | 1.5 | 7.5 | 1.63 | 1.17 | 1.39 | 2.80 | 120 | 300 | 30-32 | 300 | 99 |
| 35* | 21 | 70 | 1.5 | 7.5 | 2.04 | 1.47 | 1.39 | 3.51 | 120 | 300 | 30-32 | 330 | 96 |
| 36* | 21 | 70 | 1.5 | 7.5 | 2.45 | 1.76 | 1.39 | 4.21 | 120 | 300 | 30-32 | 300 | 97 |
| 37* | 21 | 70 | 1.5 | 7.5 | 2.86 | 1.98 | 1.44 | 4.84 | 120 | 300 | 30-32 | 300 | 99 |
| 38* | 21 | 70 | 1.5 | 7.5 | 3.26 | 2.34 | 1.39 | 5.60 | 120 | 300 | 30-32 | 300 | 95 |
| 39* | 21 | 70 | 1.5 | 7.5 | 3.67 | 2.63 | 1.39 | 6.30 | 120 | 300 | 30-32 | 300 | 96 |

Results:

| | Solids content (after monomer removal) | pH of latex (after monomer removal) | Gel content | S Index | Acid number | OH number | $T_g$ | Particle diameter in [nm] as a function of latex storage time in weeks | | | | | |
|---|---|---|---|---|---|---|---|---|---|---|---|---|---|
| Product | [% by wt.] | | [% by wt.] | | [mg KOH/g of microgel] | | [° C.] | 0 | 2 | 4 | 6 | 8 | 12 |
| 33  | 24.0 | 7.5 | 97.3 | 7.6 | 4.7 | 30.8 | 42   | 67 | 87 | 120 | coag. | coag. | coag. |
| 34* | 25.3 | 7.0 | 96.8 | 8.1 | 6.4 | 30.0 | 39   | 56 | 57 | 70  | 99    | coag. | coag. |
| 35* | 25.1 | 8.0 | 96.4 | 7.9 | 6.2 | 29.7 | 40   | 53 | 52 | 61  | 56    | 59    | 64 |
| 37* | 26.4 | 8.3 | 96.1 | 8.2 | 7.2 | 30.8 | 37.5 | 51 | 51 | 58  | 55    | 53    | 53 |
| 37* | 25.1 | 8.5 | 96.3 | 8.0 | 7.5 | 28.7 | 36.5 | 56 | 54 | 62  | 58    | 54    | 57 |
| 38* | 25.3 | 8.7 | 96.0 | 8.1 | 8.8 | 30.8 | 41.5 | 54 | 61 | 56  | 52    | 54    | 56 |
| 39* | 23.7 | 8.8 | 95.9 | 8.3 | 8.6 | 31.4 | 43.5 | 53 | 58 | 53  | 52    | 53    | 55 |

In experimental series (6), examples 34*, 35*, 36*, 37*, 38* and 39* according to the invention show that the resultant Experimental series (7): Effect of ratio by weight of resin acid to fatty acid on latex stability (examples according to the invention)

| | Monomers [parts by weight] | | | | Emulsifiers [phm] | | | | | Water | Polymerisation temperature | Polymerisation time | Conversion |
|---|---|---|---|---|---|---|---|---|---|---|---|---|---|
| Product | Butadiene[1] | Styrene[2] | TMPTM[3] | HEMA[4] | RA[5] | FA[6] | RA/FA | RA + FA | Degree of neutralisation [%] | [phm] | [° C.] | [min] | [%] |
| 40* | 21 | 70 | 1.5 | 7.5 | 0.20 | 2.42 | 0.08 | 2.62 | 120 | 300 | 30-32 | 300 | 100 |
| 41* | 21 | 70 | 1.5 | 7.5 | 0.41 | 2.20 | 0.19 | 2.61 | 120 | 300 | 30-32 | 300 | 95 |
| 42* | 21 | 70 | 1.5 | 7.5 | 0.61 | 1.98 | 0.31 | 2.59 | 120 | 300 | 30-32 | 300 | 98 |
| 43* | 21 | 70 | 1.5 | 7.5 | 0.82 | 1.76 | 0.47 | 2.58 | 120 | 300 | 30-32 | 300 | 97 |
| 44* | 21 | 70 | 1.5 | 7.5 | 1.02 | 1.54 | 0.66 | 2.56 | 120 | 300 | 30-32 | 300 | 100 |
| 45* | 21 | 70 | 1.5 | 7.5 | 1.22 | 1.32 | 0.92 | 2.54 | 120 | 300 | 30-32 | 335 | 95 |

Experimental series (7): Effect of ratio by weight of resin acid to fatty acid on latex stability (examples according to the invention)

Results:

| Product | Solids content (after monomer removal) [% by wt.] | pH of latex (after monomer removal) | Gel content [% by wt.] | S Index | Acid number | OH number [mg KOH/g of microgel] | $T_g$ [° C.] | Particle diameter in [nm] as a function of storage time in weeks | | | | | |
|---|---|---|---|---|---|---|---|---|---|---|---|---|---|
| | | | | | | | | 0 | 2 | 4 | 6 | 8 | 12 |
| 40* | 27.1 | 7.8 | 93.0 | 8.4 | 4.3 | 28.2 | 37.0 | 51 | 56 | 60 | 85 | 95 | 135 |
| 41* | 23.9 | 7.9 | 70.3 | 7.6 | 4.4 | 31.4 | 42.0 | 60 | 59 | 57 | 60 | 61 | 67 |
| 42* | 25.1 | 7.8 | 73.8 | 8.2 | 4.3 | 29.8 | 37.0 | 52 | 53 | 67 | 70 | 83 | 115 |
| 43* | 25.1 | 8.0 | 73.5 | 7.5 | 4.8 | 30.4 | 37.5 | 54 | 60 | 59 | 57 | 58 | 62 |
| 44* | 25.3 | 7.6 | 74.0 | 7.7 | 4.1 | 27.3 | 35.5 | 59 | 57 | 69 | 73 | 84 | 97 |
| 45* | 24.6 | 7.9 | 71.2 | 7.6 | 3.8 | 30.4 | 42.0 | 61 | 61 | 62 | 63 | 76 | coag. |

In experimental series (7), examples 40* to 45* according to the invention show that the lattices obtained are stable with latex storage times of more than 6 weeks if the ratio by weight of resin acid to fatty acid is greater than 0.08/1.

Experimental series (8): Storage-stable microgel latices with different glass transition temperature

| Product | Monomers [parts by weight] | | | | Emulsifiers [phm] | | | | Water [phm] | Polymerisation temperature [° C.] | Polymerisation time [min] | Conversion [%] |
|---|---|---|---|---|---|---|---|---|---|---|---|---|
| | Butadiene[1] | Styrene[2] | TMPTM[3] | HEMA[4] | RA[5] | FA[6] | RA/FA | RA + FA | Degree of neutralisation [%] | | | | |
| 46* | 45.13 | 43.37 | 4 | 7.5 | 2.45 | 1.76 | 1.39 | 4.21 | 120 | 300 | 15 | 360 | 96 |
| 47* | 61.95 | 26.55 | 4 | 7.5 | 2.45 | 1.76 | 1.39 | 4.21 | 120 | 300 | 15 | 300 | 93 |
| 48* | 7.00 | 80.5 | 5 | 7.5 | 2.45 | 1.76 | 1.39 | 4.21 | 120 | 300 | 30 | 300 | 96 |
| 49* | — | 91 | 1.5 | 7.5 | 2.45 | 1.76 | 1.39 | 4.21 | 120 | 200 | 30-70 | 60 | 96 |
| 50* | 52 | 42.5 | 2.5 | 3.0 | 2.45 | 1.76 | 1.39 | 4.21 | 120 | 300 | 30 | 320 | 95 |
| 51* | 46.5 | 31.0 | 12.5 | 10 | 2.45 | 1.76 | 1.39 | 4.21 | 120 | 200 | 30-70 | 350 | 94 |
| 52* | 51.6 | 34.4 | 12.5 | 1.5 | 2.45 | 1.76 | 1.39 | 4.21 | 120 | 200 | 30-70 | 320 | 96 |

Results:

| Product | Solids content (after monomer removal) [% by wt.] | pH of latex (after monomer removal) | Gel content [% by wt.] | S Index | Acid number | OH number [mg KOH/g of microgel] | $T_g$ [° C.] | Particle diameter in [nm] as a function of storage time in weeks | | | | | |
|---|---|---|---|---|---|---|---|---|---|---|---|---|---|
| | | | | | | | | 0 | 2 | 4 | 6 | 8 | 12 |
| 46* | 25.0 | 8.5 | 95.7 | 8.1 | 6.1 | 33.5 | −5 | 49 | 46 | 48 | 51 | 57 | 66 |
| 47* | 23.5 | 8.5 | 91.7 | 7.2 | 6.5 | 37.6 | −35.5 | 43 | 40 | 47 | 49 | 53 | 76 |
| 48* | 25.0 | 8.1 | 92.5 | 5.4 | 6.5 | 30.4 | +83.5 | 60 | 62 | 64 | 60 | 62 | 63 |
| 49* | 30.0 | 8.2 | 91.6 | 7.5 | 6.6 | 29.1 | +103.5 | 58 | 60 | 57 | 59 | 59 | 61 |
| 50* | 24.8 | 8.4 | 93.0 | 9.5 | 6.5 | 14.5 | −21.5 | 60 | 63 | 62 | 61 | 65 | 69 |
| 51* | 25.1 | 8.3 | 9.7 | 4.4 | 5.6 | 46.7 | −5 | 55 | 58 | 61 | 64 | 71 | 88 |
| 52* | 24.9 | 8.5 | 95 | 4.9 | 5.3 | 5.1 | −20 | 60 | 61 | 58 | 63 | 63 | 65 |

In experimental series (8), the examples according to the invention show that, given an ideal resin/fatty acid ratio of 1.39/1 and given an ideal degree of neutralisation of 120%, it is possible to produce storage-stable hydroxy-modified microgel lattices with glass transition temperatures in the range from −5° C. to +103.5° C. and with hydroxy numbers in the range from 5.1 to 46.7 mg KOH/g of microgel.

The result found from experimental series (1) to (8) is that, to produce storage-stable microgel lattices containing hydroxy groups simultaneous compliance with the following parameters is necessary during the emulsion polymerisation reaction:

1) ratio by weight of disproportionated resin acid to partially hydrogenated fatty acid: from 1/15 to 15/1, preferably from 1/12 to 12/1

2) total of weights of disproportionated resin acid and of partially hydrogenated fatty acid: >2.2 parts by weight, preferably >2.5 parts by weight, based on 100 parts by weight of the entire monomer mixture 3) degree of neutralisation of disproportionated resin acid and of partially hydrogenated fatty acid: from 104 to 165%, preferably from 105 to 160%

In order to achieve adequately large crumb with diameters >5 mm in the coagulation of the microgel lattices produced according to the invention, it was essential that the temperatures used during coagulation of the latex are higher than the glass transition temperatures of the corresponding microgels by 15° C.

The present invention has been described with reference to specific details of particular embodiments thereof. It is not intended that such details be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

What is claimed is:

1. A process for the production of a microgel, comprising: polymerizing, via emulsion polymerization, monomers in the presence of an emulsifier, wherein said emulsifier comprises a mixture of a modified resin acid and a fatty acid, wherein the degree of neutralisation of the mixture is from 106 to 145%, thereby forming said microgel.

2. The process according to claim 1, wherein the monomers are selected from the group consisting of conjugated dienes, vinylaromatic monomers, crosslinking monomers, and monomers containing hydroxy groups.

3. The process according to claim 1, further comprising after said polymerization, coagulation of the microgel at temperatures above the glass transition temperature of the microgel.

4. The process according to claim 3, wherein the coagulation is carried out at a temperature which is higher by at least 10° C. than the glass transition temperature of the microgel.

5. The microgel obtained by the process according to claim 1.

6. The microgel according to claim 5, wherein said microgel has more than 70% by weight gel content.

7. The microgel according to claim 5, wherein the microgel has a swelling index of less than 30.

8. The microgel according to claim 5, wherein the microgel has more than 0.1% by weight content of copolymerised monomers containing hydroxy groups.

9. The microgel according to claim 8, wherein the microgel has a hydroxy number greater than 0.5.

* * * * *